United States Patent
Power

(10) Patent No.: US 7,247,348 B2
(45) Date of Patent: Jul. 24, 2007

(54) METHOD FOR MANUFACTURING A EROSION PREVENTATIVE DIAMOND-LIKE COATING FOR A TURBINE ENGINE COMPRESSOR BLADE

(75) Inventor: Robert L. Power, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 379 days.

(21) Appl. No.: 10/788,128

(22) Filed: Feb. 25, 2004

(65) Prior Publication Data

US 2005/0227078 A1    Oct. 13, 2005

(51) Int. Cl.
C23C 16/26    (2006.01)

(52) U.S. Cl. .............. 427/249.7; 427/577; 427/295; 204/192.1

(58) Field of Classification Search .......... 427/249.7, 427/577, 294, 596; 204/192.1
See application file for complete search history.

(56) References Cited

U.S. PATENT DOCUMENTS

| | | | |
|---|---|---|---|
| 5,055,318 A | 10/1991 | Deutchman et al. | |
| 5,206,083 A * | 4/1993 | Raj et al. | 428/323 |
| 5,423,475 A | 6/1995 | Burke | |
| 5,714,202 A * | 2/1998 | Lemelson et al. | 427/249.14 |
| 5,728,465 A | 3/1998 | Dorfman et al. | |
| 5,947,710 A * | 9/1999 | Cooper et al. | 418/63 |
| 6,099,976 A | 8/2000 | Lemelson et al. | |
| 6,258,237 B1 | 7/2001 | Gal-Or et al. | |
| 6,605,160 B2 * | 8/2003 | Hoskin | 148/222 |
| 6,988,877 B2 * | 1/2006 | Bush et al. | 418/178 |
| 7,010,936 B2 * | 3/2006 | Rini et al. | 62/507 |

OTHER PUBLICATIONS

Derwent Abstract of WO 2006028941 dated Mar. 2006,—2006-204521.*

* cited by examiner

Primary Examiner—Bret Chen
(74) Attorney, Agent, or Firm—Ingrassia Fisher & Lorenz

(57) ABSTRACT

Methods for making an erosion resistant gas turbine engine compressor airfoil substrates coated with a diamond-like coating (DLC), wherein the coating airfoil substrates are protected from ingested abrasive particulates, may include the step of performing a hydrogen-free chemical vapor deposition (CVD) process by ablation of a graphite target in a vacuum. The DLC may be comprised predominantly of $sp^3$ (tetrahedral) carbon, and may be devoid of detectable amounts of hydrogen.

20 Claims, 3 Drawing Sheets

METHOD FOR MANUFACTURING A EROSION PREVENTATIVE DIAMOND-LIKE COATING FOR A TURBINE ENGINE COMPRESSOR BLADE

BACKGROUND OF THE INVENTION

The present invention generally relates to erosion resistant gas turbine engine compressor components having a diamond-like coating (DLC) thereon, and to methods for forming such compressor components.

In the compressor of gas turbine engines, axial flow compressor blades and stator vanes may be exposed to sand, dust, and other air-borne particulates for extended periods of time. Ingestion of particulates, such as sand, by gas turbine engines may lead to component failure, and drastically accelerates deterioration in engine performance. Some gas turbine engines in rotary wing aircraft that routinely demonstrate adequate operational performance for 1500 hours in a clean environment, may demonstrate adequate operational performance for as little as 100 hours in severe environments such as deserts. This deterioration in engine performance is due principally to loss of compressor efficiency caused by erosion of compressor blades. Thus, erosion of compressor blades due to ingestion of sand or other particulates leads to decreased life cycle of turbine engines (i.e., their premature removal), or necessitates compressor blade replacement.

Prior art gas turbine engine components, including compressor blades, have been coated with aluminides to inhibit oxidation and corrosion of the component surface. However, such coatings do not prevent erosion of compressor blades by sand or other particulates ingested by the engine.

Compressor blades have been coated with titanium nitride (TiN) for erosion protection. However, such TiN coatings are relatively thick, for example, up to about 20 microns or more, and cracks formed within such coatings tend to propagate to the parent material, i.e., compressor blade, thereby decreasing fatigue life of the compressor blade.

U.S. Pat. No. 5,423,475 to Burke et al. discloses a diamond film applied to an aluminum or aluminum alloy substrate by first depositing the diamond film on a silicon substrate, chemically etching with hydrofluoric acid to remove most of the silicon to form a hybrid diamond/silicon layer, and bonding the hybrid diamond/silicon layer to the aluminum or aluminum alloy substrate.

U.S. Pat. No. 6,099,976 to Lemelson et al. discloses a multilayer coating for gas turbine engine parts that have a thermal barrier coating (TBC) thereon to protect the parts from elevated temperatures, wherein a diamond film overlay is applied to a ceramic, columnar TBC to improve erosion resistance of the TBC.

U.S. Pat. No. 5,728,465 to Dorfman et al. discloses a corrosion resistant coating comprising a diamond like solid state material which comprises a diamond-like network stabilized with hydrogen, a silicon network stabilized with oxygen, and optionally various dopant elements or dopant compounds.

The presence of hydrogen, or other elements (other than carbon), in a DLC may materially interfere with the interlocking $sp^3$ network of covalent bonds thereby materially weakening structural rigidity.

As can be seen, there is a need for a gas turbine engine having DLC-coated compressor components, such as axial flow compressor blades and stator vanes, for erosion protection of the compressor components, for maintaining engine performance during operation in the presence of air-borne particulates, and for maximizing the life cycle of the compressor components.

There is a further need for a simple, rapid, and straightforward process for forming a DLC directly on an airfoil substrate surface, such as a surface of an axial flow compressor blade. There is a further need for a method for making a compressor component for a gas turbine engine, such as an axial flow compressor blade or a stator vane, wherein the compressor component is coated with a DLC in a hydrogen-free deposition process, whereby the adverse effects of hydrogen contamination of the DLC are avoided.

SUMMARY OF THE INVENTION

In one aspect of the present invention, there is provided a method for making a compressor component for a gas turbine engine, wherein the method comprises providing an airfoil substrate having an airfoil substrate surface, and depositing a diamond-like coating (DLC) directly on the airfoil substrate surface. The airfoil substrate may comprise an axial flow compressor blade or a stator vane.

In another aspect of the present invention, there is provided a method for making a compressor component for a gas turbine engine, comprising providing an airfoil substrate having a substrate surface; and depositing a DLC directly on the substrate surface, wherein the airfoil substrate comprises an axial flow compressor blade or a stator vane, and wherein the DLC is deposited via a chemical vapor deposition process by ablation of a graphite target. The DLC may comprise at least about 90 wt % $sp^3$ carbon.

In still another aspect of the present invention, there is provided a method for making a compressor component for a gas turbine engine, comprising providing an airfoil substrate having a substrate surface; degreasing the substrate surface; and depositing a DLC directly on the substrate surface. The substrate surface may be curved and the airfoil substrate may comprise a material such as an iron-based alloy, a titanium-based alloy, a nickel-based alloy, or a cobalt-based alloy.

In yet another aspect of the present invention, an erosion resistant compressor component for a compressor of a gas turbine engine may comprise an airfoil substrate having at least one airfoil surface, and a DLC disposed directly on the airfoil surface.

In an additional aspect of the present invention, there is provided an erosion resistant gas turbine engine which may comprise a compressor including at least one airfoil component, the airfoil component having at least one airfoil surface, and the airfoil surface including a DLC disposed directly on the airfoil surface.

In a further aspect of the present invention, there is provided a vehicle adapted for operation in the presence of abrasive air-borne particulates, wherein the vehicle may comprise at least one gas turbine engine. The gas turbine engine may include a compressor having at least one airfoil component, the airfoil component having at least one airfoil surface, and the airfoil surface including a DLC disposed directly on the airfoil surface.

These and other features, aspects and advantages of the present invention will become better understood with reference to the following drawings, description and claims.

DETAILED DESCRIPTION OF THE INVENTION

Figure 1:
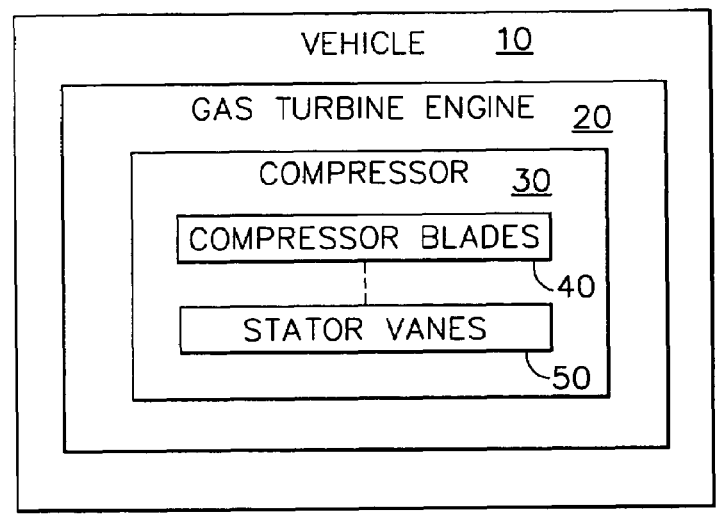
FIG. 1 is a block diagram schematically representing a vehicle having an erosion-resistant gas turbine engine, according to one embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides components, such as axial flow compressor blades and stator vanes, for a compressor of a gas turbine engine, wherein the components include a diamond-like coating (DLC) for protecting the component from erosion by air-borne particulates. Such air-borne particulates may include dust and sand, and the like.

The present invention also provides methods for making erosion resistant gas turbine engine compressor components coated with a DLC. Gas turbine engines incorporating DLC-coated components according to the present invention may find applications as primary or secondary power sources in electrical power generation, as well as in vehicles, such as fixed- and rotary wing commercial- and military aircraft, and land vehicles, such as tanks.

As a specific example, DLC-coated compressor components of the instant invention may be used to protect gas turbine engines and auxiliary power units of tanks and rotary wing aircraft from erosion during operation in deserts or other environments having copious amounts of air-borne dust or sand.

Erosion of compressor components, such as prior art or uncoated compressor blades, is a function of impact energy of a particle (e.g., a grain of sand) which strikes the component surface, as well as the relative hardness and coefficient of friction of the material constituting the component. As an example, sand, with a typical Vickers hardness number (VHN) of about 1000, causes severe erosion of a conventional, uncoated stainless steel compressor blade having a hardness of about 400 VHN and a coefficient of friction of 0.6, when striking the compressor component at a velocity of about 1200 feet per second. DLCs, which are resilient and up to eight times harder than sand and which may have a coefficient of friction of 0.1, may decrease erosion of compressor components by at least one order of magnitude (at least 10×) when applied directly to the component surface.

In general, a DLC-coated compressor component of the instant invention may be formed by chemical vapor deposition (CVD) of an amorphous DLC to a surface of the component. Compressor components which may be coated with a DLC under the invention may include axial flow compressor blades and stator vanes. Various CVD processes may be used to form a DLC on a compressor blade or stator vane for a gas turbine engine compressor, such that the applied DLC may afford up to 99% reduction in erosion rate, as determined by reduction in blade/vane weight per unit quantity of sand ingested by the engine.

In contrast to the DLC-coated compressor components of the invention, compressor blades and stator vanes of prior art gas turbine engines have been either uncoated, coated with an aluminide coating for corrosion protection, or coated with a ceramic such as TiN for erosion protection. Uncoated compressor components and those having aluminide coatings are prone to rapid erosion, particularly in dusty and sandy environments. For example, in prior art gas turbine engines about 50% of the compressor blades may require replacement at overhaul after operation in arid or desert environments, and about 75% of these replacements may be due to erosion.

As noted hereinabove, prior art ceramic coatings, such as TiN, for erosion protection of compressor components, are prone to form cracks which may propagate to the parent material, thereby decreasing fatigue life of the component. Further, DLCs may be about 100 times (100×) more resistant to abrasive particle erosion than TiN coatings of prior art gas turbine engine compressor components.

In further contrast to the prior art, according to the present invention a DLC may be applied directly to an airfoil surface of a compressor component (compressor blade or stator vane).

Prior art DLCs may comprise hydrogen and various other elements in addition to carbon. For example, hydrogen is present in some prior art DLC coatings formed by CVD processes that employ a hydrocarbon gas as the source (precursor) of free carbon ions. The hardness of a DLC varies according to the ratio of C atoms to H atoms, which may be in the range of about 2:1. In general, the higher the C:H ratio, the greater the hardness of the DLC. The C:H ratio may vary according to the deposition parameters, and the composition of the precursor material.

In further contrast to certain prior art DLCs, coatings applied according to the present invention may be devoid of hydrogen and measurable quantities of any element other than carbon. The presence of hydrogen in DLCs of the present invention may be avoided because, inter alia, hydrogen reduces hardness of the coating, and thus the effectiveness of the coating in preventing erosion may be reduced.

FIG. 1 is a block diagram schematically representing a vehicle 10 which may have at least one erosion resistant gas turbine engine 20, according to one embodiment of the invention. Gas turbine engine 20 may include a compressor 30. Compressor 30 may include a plurality of compressor blades 40 and a plurality of stator vanes 50 (see, for example, FIG. 3A). Each of the plurality of compressor blades 40 and each of the plurality of stator vanes 50 may comprise an airfoil substrate having at least one curved (airfoil) surface and a DLC disposed directly on the airfoil substrate surface (see, for example, FIG. 4). In general, airfoils for gas turbine engine compressors are well known in the art.

Although FIG. 1 shows a vehicle, gas turbine engines operated for electric or auxiliary power generation may also be exposed to air-borne abrasive particulates, and the present invention may similarly be applicable to gas turbine engines used for power generation.

Figure 2:
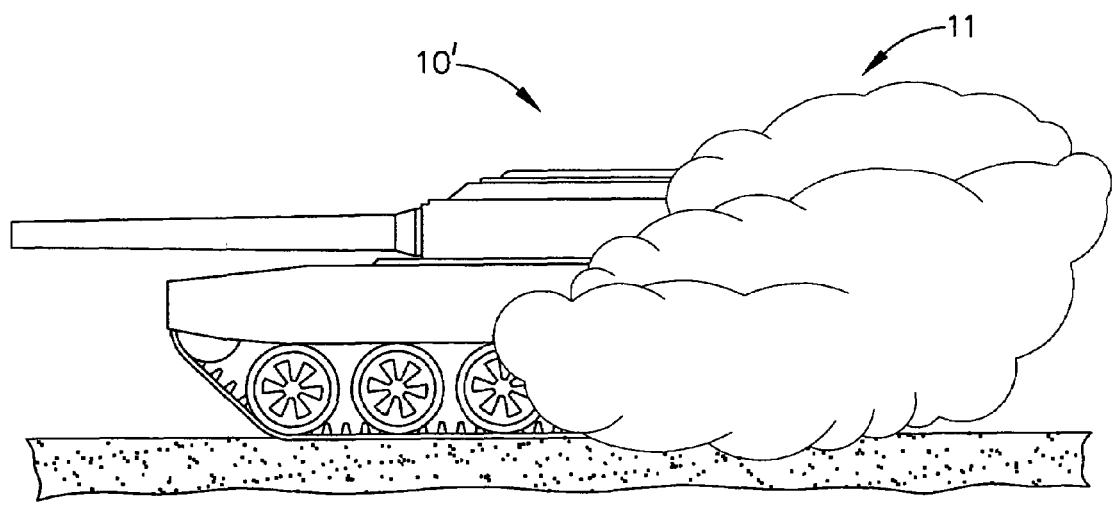
FIG. 2 schematically represents a turbine engine-powered land vehicle, as seen from the side, operating in an environment having copious amounts of air-borne abrasive particulates, according to one embodiment of the invention.

FIG. 2 schematically represents a turbine engine-powered land vehicle 10', as seen from the side, operating in an environment having copious amounts of air-borne abrasive particulates, according to one embodiment of the invention. Such abrasive particulates may become air-borne as a result of vehicular activity, by the prevailing weather conditions (e.g., wind, sand storms), or by a combination of the two, as an example. Vehicle 10' may have at least one gas turbine engine 20 (the latter is not shown in FIG. 2 for the sake of clarity).

As shown, vehicle 10' is partially enshrouded within a "cloud" 11 of dust or sand. Although vehicle 10' may be equipped with a high efficiency air filter or particle separator (not shown), which may be designed to remove about 99% of abrasive particles from air entering gas turbine engine 20, substantial quantities of sand may nevertheless be ingested into gas turbine engine 20, whereby severe erosion of compressor components may ensue in the absence of an appropriate erosion resistant coating. As an example, assuming an air/sand ratio in a dust cloud of about 4:1 (wt./wt.), a particle separator efficiency of about 99%, and a typical mass flow rate for a 1500 hp engine of 10 to 13 pounds per second, sand ingestion into the engine may occur at a rate of about 100 pounds per hour. Compressor components of the present invention, such as axial flow compressor blades and stator vanes, which may have a suitable DLC applied directly to the airfoil surface of the blade or vane, may provide protection from such erosion.

Although FIG. 2 shows a land vehicle, aircraft may also be operated in dusty or sandy environments, and the present invention may similarly be applicable to commercial aircraft, military aircraft, fixed wing aircraft, and rotary wing aircraft.

Figure 3A:
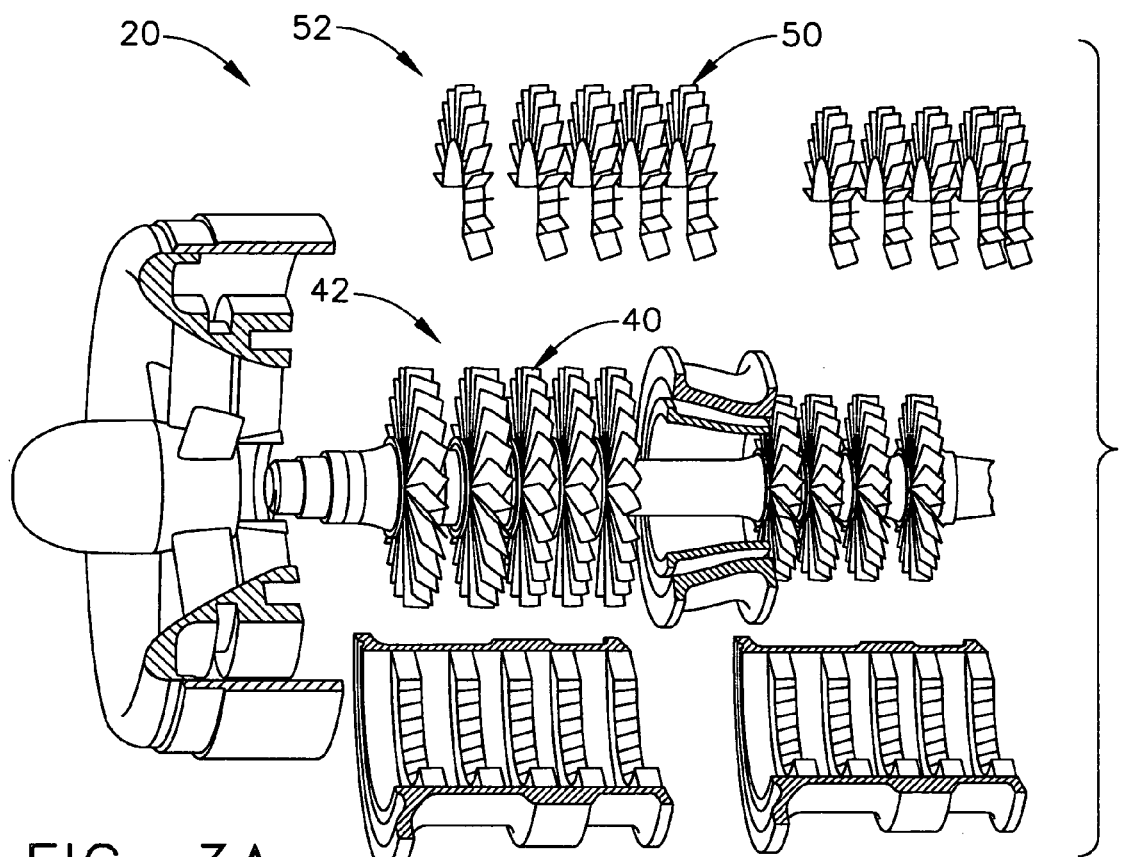
FIG. 3A is a cutaway view of a portion of a gas turbine engine showing a plurality of compressor blades and a plurality of stator vanes, according to one embodiment of the invention.
Figure 3B:
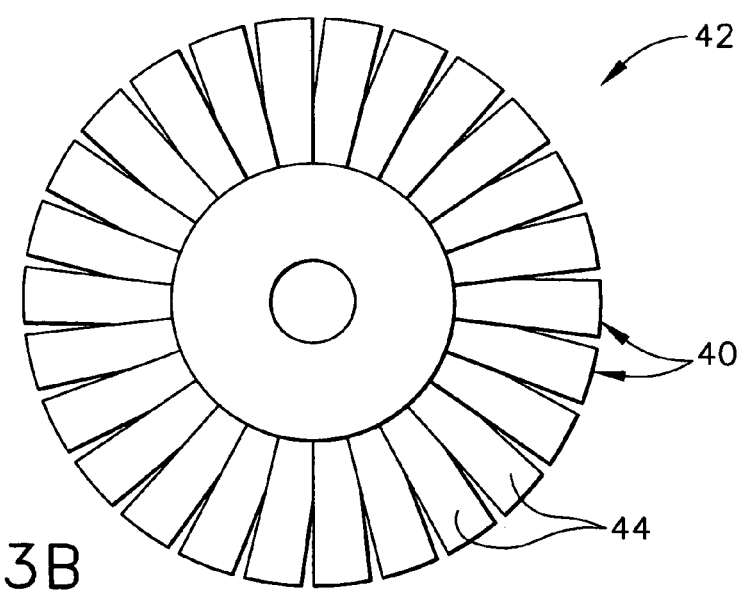
FIG. 3B is an axial view schematically representing a rotor of the gas turbine engine of FIG. 3A, according to the invention.

FIG. 3A is a cutaway view of a portion of an erosion resistant gas turbine engine 20, according to the invention. Gas turbine engine 20 may include a plurality of rotors 42, each having a plurality of compressor blades 40 (see FIG. 3B). Gas turbine engine 20 may further include a plurality of stators 52, each having a plurality of vanes 50. FIG. 3B is an axial view schematically representing a rotor 42 of gas turbine engine 20 showing compressor blades 40. Each compressor blade 40 may have an airfoil surface 44. To prevent erosion of compressor blade 40, airfoil surface 44 of each compressor blade 40 may have a suitable DLC applied directly thereto (see, for example, FIG. 4).

Reference numeral "44" in FIG. 3B may be used to indicate airfoil surface 44 in a generic sense. For example, airfoil surface 44 may include the leading airfoil surface and the trailing airfoil surface of compressor blades 40. According to some embodiments of the present invention, the entire airfoil surface of compressor blades 40 may be coated with a suitable DLC. Airfoil surfaces of stator vanes 50' (see FIG. 3A) may similarly be coated with a suitable DLC, analogous to airfoil surfaces 44 of compressor blades 40' as described hereinabove with reference to FIG. 3B. In some embodiments of the present invention, the DLC may be selectively applied to certain compressor components or component surfaces, for example, as described hereinbelow with reference to FIG. 5.

Figure 4:
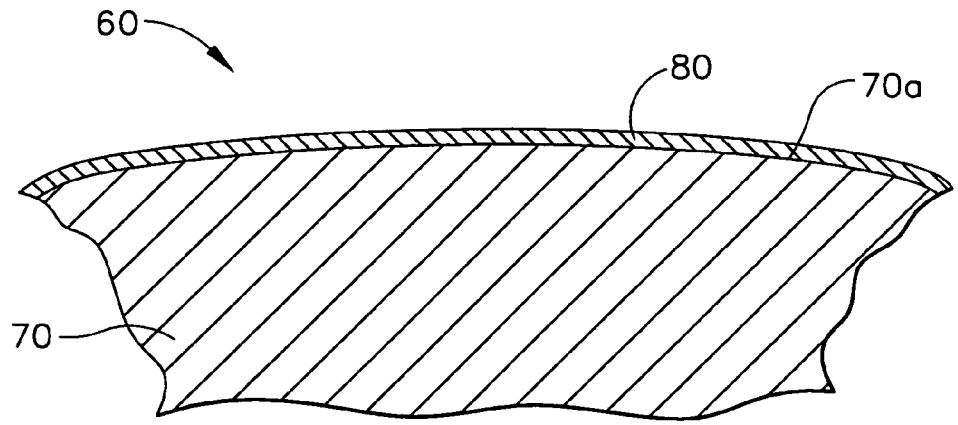
FIG. 4 is a sectional view schematically representing a portion of a gas turbine engine compressor component having a DLC disposed directly on an airfoil surface of the compressor component, according to the invention.

FIG. 4 is a sectional view schematically representing a portion of a coated compressor component 60 for a gas turbine engine, according to the invention. Coated compressor component 60 may be an airfoil component such as a compressor blade 40 or a stator vane 50. Coated compressor component 60 may include an airfoil substrate 70 having an airfoil substrate surface 70a. Airfoil substrate 70 may comprise various metal alloys, such as an iron-based alloy, a titanium-based alloy, a nickel-based alloy, or a cobalt-based alloy. As an example, airfoil substrate 70 may comprise a material such as steel, stainless steel, or a nickel-steel alloy. A DLC 80 may be disposed directly on airfoil substrate surface 70a to protect airfoil substrate surface 70a and coated compressor component 60 from erosion.

Figure 5:
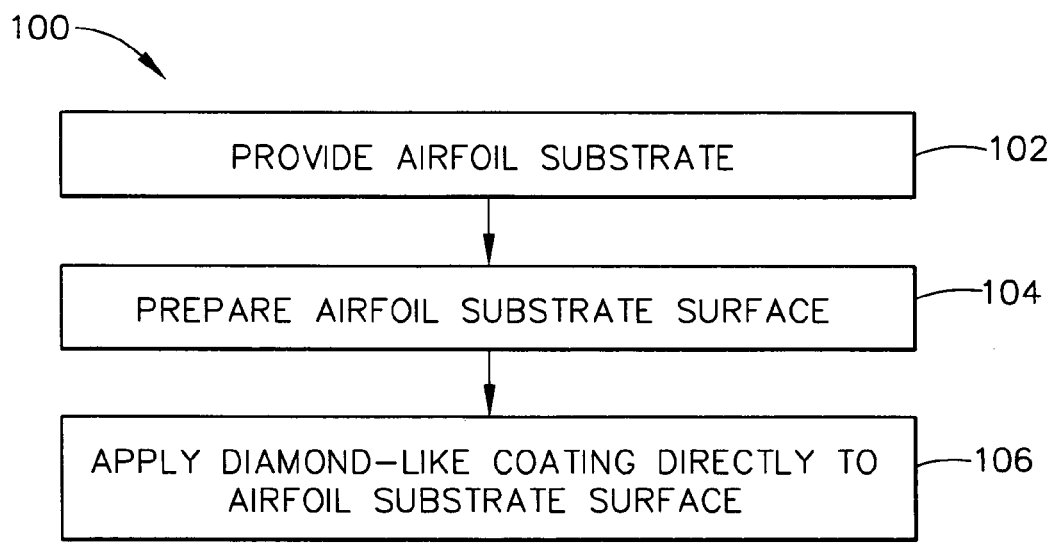
FIG. 5 schematically represents a series of steps involved in a method for making an erosion resistant compressor component having a DLC disposed directly on an airfoil surface, according to another embodiment of the invention.

DLC 80 may be applied to airfoil substrate surface 70a by a CVD process, for example as described hereinbelow with reference to method 100 (FIG. 5). DLC 80 may comprise at least about 98 wt % carbon, usually at least about 99 wt % carbon, and often at least about 99.5 wt % carbon. In some embodiments, DLC 80 may consist essentially of carbon, wherein any hydrogen or other extraneous elements are at undetectable levels or absent.

DLC 80 may predominantly comprise amorphous $sp^3$ (tetrahedral) carbon, for example, having at least 50 wt % of the total carbon as amorphous $sp^3$ carbon. DLC 80 may further comprise polycrystalline carbon (diamond), as well as amorphous $sp^2$ carbon. The relative amounts of $sp^2$ and $sp^3$ carbon in DLC 80 may be a function of the energy levels at the site of nucleation during formation of DLC 80; in general, the higher the energy level, the greater the $sp^3$ carbon:$sp^2$ carbon ratio of DLC 80.

In general, the hardness of DLC 80 is directly proportional to the $sp^3$ carbon:$sp^2$ carbon ratio. The presence of $sp^2$ carbon with $sp^3$ carbon may offer sites in the grain boundaries for initiation of erosion. DLC 80 may typically comprise at least about 90 wt % $sp^3$ carbon, usually at least about 95 wt % $sp^3$ carbon, and often at least about 99 wt % $sp^3$ carbon. DLC 80 may typically have a Vickers hardness number (VHN) in the range of from about 4000 to 8000.

DLC 80 may typically have a thickness in the range of from about 0.5 to 10 microns, usually from about 1 to 7 microns, and often from about 2 to 4 microns (1 micron=0.00004 inch). While not being bound by theory, applicant believes that DLC 80 may be applied as a layer that may afford erosion protection to airfoil substrate 70, and yet is sufficiently thin that any cracks that may form in DLC 80 may not act as a stress riser, and therefore any such cracks may not propagate to the parent material of airfoil substrate 70.

DLC 80 may typically have a coefficient of friction in the range of from about 0.07 to 0.2, usually from about 0.1 to 0.2, expressed as the ratio of the force required to move a 100 Cr6 ball over the DLC surface to the weight of the ball. In contrast, TiN coatings of the prior art may have a coefficient of friction of about 0.65, while uncoated stainless steel compressor blades may have a coefficient of friction in the range of from about 0.6 to 0.9. In general, the lower the coefficient of friction of a surface material, the greater the erosion protection afforded by the surface material.

FIG. 5 schematically represents a series of steps involved in a method 100 for making an erosion resistant coated component for a gas turbine engine compressor, according to another embodiment of the invention, wherein the coated component may have an erosion resistant DLC disposed directly on a surface of the component. The coated component prepared according to method 100 may be an axial flow compressor blade or a stator vane.

In some embodiments of the instant invention, the erosion resistant DLC may be applied to the entire airfoil surface of all axial flow compressor blades. For example, the leading and trailing airfoil surfaces on both the pressure side and the vacuum side of the airfoil may be coated with the DLC. In other embodiments of the present invention, certain compressor components of a given turbine engine type may be coated with the DLC, while other compressor components of the same engine type may remain uncoated.

In general, erosion is more prevalent on leading airfoil surfaces than trailing airfoil surfaces, and is more prevalent on the pressure side than on the vacuum side of the airfoil. Further, stator vanes are generally less susceptible to erosion than compressor blades. Based on the relative susceptibility of various compressor components and airfoil surfaces to erosion, a cost/benefit analysis may be performed for a given engine type and/or for a given type of operating environment, to determine which components and surfaces should be coated with the DLC.

Step 102 may involve providing an airfoil substrate having at least one airfoil substrate surface. The airfoil substrate surface may have convex or concave curvature. The airfoil substrate provided in step 102 may comprise an alloy, such as an iron-based alloy, a titanium-based alloy, a nickel-based alloy, or a cobalt-based alloy. As an example, the airfoil substrate provided in step 102 may comprise a material such as steel, stainless steel, or a nickel-steel alloy.

Step 104 may involve preparing the airfoil substrate surface to which the DLC is to be applied. Surface preparation may include degreasing the airfoil substrate surface, for example, by the application of a surfactant. Thereafter, the airfoil substrate surface may be rinsed with de-ionized water. Thereafter, the airfoil substrate surface may be dried by the application of forced air.

Step 106 may involve applying a DLC directly to the airfoil substrate surface. The DLC may be applied directly to the airfoil substrate surface via a chemical vapor deposition (CVD) process. Step 106 may involve applying the DLC directly to the airfoil substrate surface via a hydrogen-free CVD process (e.g., in the absence of hydrogen).

A CVD process for applying the DLC to the airfoil substrate surface may involve ablating a graphite target using a suitable energy source, such as a hot filament, a laser, or various plasmas. A plasma for ablating the graphite target may be, for example, an arc plasma, a radiofrequency plasma, or a microwave plasma.

Step 106 may involve depositing the DLC on the airfoil substrate surface in a vacuum. The DLC applied to the airfoil substrate surface may typically comprise at least about 98 wt % carbon, usually at least about 99 wt % carbon, and often at least about 99.5 wt % carbon. The DLC applied to the airfoil substrate surface may be devoid of measurable quantities of hydrogen or other extraneous elements.

The DLC may be applied to the airfoil substrate surface at a temperature typically in the range of from about 800 to 1000° F., and often from about 850 to 950° F. The DLC may applied to the airfoil substrate surface in step 106 to a thickness in the range of from about 0.5 to 10 microns, usually from about 1 to 7 microns, and often from about 2 to 4 microns. In some embodiments, one or more portions of the airfoil substrate may be masked during step 106 to selectively prevent deposition of the DLC.

The DLC applied to the airfoil substrate surface may typically have a Vickers hardness number (VHN) in the range of from about 4000 to 8000. The DLC may typically have a coefficient of friction in the range of from about 0.07 to 0.2, and usually from about 0.1 to 0.2.

The DLC applied to the airfoil substrate surface may typically comprise at least about 90 wt % $sp^3$ carbon, usually at least about 95 wt % $sp^3$ carbon, and often at least about 99 wt % $sp^3$ carbon, and the balance, if any, of total carbon of the DLC may comprise $sp^2$ carbon. The relative amounts of $sp^2$ and $sp^3$ carbon in the DLC is a function of the energy levels at the site of nucleation during formation of the DLC.

Generally, the higher the energy level at the site of nucleation, the greater the $sp^3$ content of the DLC. Energy levels at the site of nucleation may depend on the energy source during ablation of the graphite target, the relative voltage potential, the temperature, and focusing of free ionized carbon, as well as transmission losses. Deposition parameters for step 106 may be adjusted to provide a DLC having the characteristics as defined herein, for example, with respect to composition (e.g., $sp^3$ content), hardness, and coefficient of friction.

It should be understood, of course, that the foregoing relates to exemplary embodiments of the invention and that modifications may be made without departing from the spirit and scope of the invention as set forth in the following claims.

I claim:

1. A method for making a compressor component for a gas turbine engine, comprising:
   a) providing an airfoil substrate having a metal airfoil substrate surface; and
   b) depositing a diamond-like coating directly on said metal airfoil substrate surface, wherein said airfoil substrate comprises an axial flow compressor blade or a stator vane.

2. The method of claim 1, wherein said airfoil substrate comprises a material selected from the group consisting of an iron-based alloy, a titanium-based alloy, a nickel-based alloy, and a cobalt-based alloy.

3. The method of claim 1, wherein said airfoil substrate comprises a material selected from the group consisting of steel, stainless steel, and a nickel-steel alloy.

4. The method of claim 1, wherein said step b) comprises depositing said diamond-like coating by chemical vapor deposition.

5. The method of claim 1, wherein said step b) comprises depositing said diamond-like coating in a vacuum.

6. The method of claim 1, wherein said step b) comprises depositing said diamond-like coating by ablation of a graphite target.

7. The method of claim 6, wherein said graphite target is ablated by an energy source selected from the group consisting of a plasma, a hot filament, and a laser.

8. The method of claim 7, wherein said plasma Is selected from the group consisting of an arc plasma, a radiofrequency plasma, and a microwave plasma.

9. The method of claim 1, wherein said diamond-like coating comprises predominantly amorphous $sp^3$ carbon.

10. The method of claim 9, wherein said diamond-like coating further comprises polycrystalline diamond.

11. The method of claim 1, wherein said diamond-like coating comprises at least about 95 wt % $sp^3$ carbon.

12. The method of claim 1, wherein said diamond-like coating comprises at least about 99 wt % $sp^3$ carbon.

13. The method of claim 1, wherein said airfoil substrate comprises a steel or stainless steel compressor blade.

14. A method for maldng a compressor component for a gas turbine engine, comprising:
   a) providing an airfoil substrate having a substrate surface; and
   b) depositing a diamond-like waling directly on said substrate surface, wherein said airfoil substrate comprises an axial flow compressor blade or a stator vane, wherein said step b) comprises deposfting said diamond-like coating via a chemical vapor deposition process by ablation of a graphite target, wherein said diamond-like coating comprises at least about 90 wt % $sp^3$ carbon.

15. The method of claim 14, wherein said step b) comprises depositing said diamond-like coating in a vacuum, and wherein said graphite target is ablated by an arc plasma, a microwave plasma, or a radiofrequency plasma.

16. The method of claim 15, wherein said airfoil substrate comprises a material selected from the group consisting of steel, stainless steel, a titanium-based alloy, and a nickel-steel alloy.

17. A method for making a compressor component for a gas turbine engine, comprising:
   a) providing an airfoil substrate having a substrate surface;
   b) degreasing said substrate surface; and
   c) after said step b), depositing a diamond-like coating directly on said substrate surface in an environment substantially absent of hydrogen, wherein said substrate surface is curved and said airfoil substrate comprises a material selected from the group consisting of an iron-based alloy, a titanium-based alloy, a nickel-based alloy, and a cobalt-based alloy.

18. The method of claim 17, wherein said diamond-like coating comprises at least about 95 wt % $sp^3$ carbon.

19. The method of claim 17, wherein said step c) comprises depositing said diamond-like coating by chemical vapor deposition in a vacuum from a graphite target ablated by an energy source selected from the group consisting of a plasma, a hot filament, and a laser, and wherein said diamond-like coating consists essentially of carbon.

20. The method of claim 17, wherein said diamond-like coating has a thickness of from about 1 to 7 microns, a Vickers hardness number of from about 4000 to 8000, and a coefficient of friction of about 0.1.

* * * * *

UNITED STATES PATENT AND TRADEMARK OFFICE
CERTIFICATE OF CORRECTION

PATENT NO.         : 7,247,348 B2
APPLICATION NO. : 10/788128
DATED                   : July 24, 2007
INVENTOR(S)       : Robert L. Power It is certified that error appears in the above-identified patent and that said Letters Patent is hereby corrected as shown below:

Column 8, line 47, "Is" should be changed to --is--;
Column 8, line 60, "maldng" should be changed to --making--;
Column 8, line 64, "waling" should be changed to --coating--;
Column 8, line 67, "deposfting" should be changed to --depositing--;
Column 9, line 8, "radioftequency" should be changed to --radiofrequency--.

Signed and Sealed this

Thirtieth Day of October, 2007

JON W. DUDAS
*Director of the United States Patent and Trademark Office*